United States Patent [19]

Winston

[11] 4,002,499

[45] Jan. 11, 1977

[54] RADIANT ENERGY COLLECTOR

[75] Inventor: Roland Winston, Chicago, Ill.

[73] Assignee: The United States of America as represented by the United States Energy Research and Development Administration, Washington, D.C.

[22] Filed: July 26, 1974

[21] Appl. No.: 492,074

[52] U.S. Cl. .............................. 136/206; 136/214; 240/103 B; 240/1.3; 250/228

[51] Int. Cl.² .......................................... H01V 1/30

[58] Field of Search ........................ 250/228, 216; 240/103 B, 1.3; 136/206, 214

[56] References Cited

UNITED STATES PATENTS

| 2,194,841 | 3/1940 | Welch | 240/103 B |
| 2,404,627 | 7/1946 | Goldberg | 240/103 B |
| 2,591,661 | 4/1952 | McCandless | 240/103 B |
| 3,130,084 | 4/1964 | Loring | 136/206 |
| 3,134,906 | 5/1964 | Henker | 250/228 |
| 3,251,984 | 5/1966 | Colterjohn | 240/1.3 |
| 3,829,677 | 8/1974 | Dellano | 240/103 B |

FOREIGN PATENTS OR APPLICATIONS

| 547,661 | 9/1942 | United Kingdom | 240/103 B |

Primary Examiner—Nelson Moskowitz
Attorney, Agent, or Firm—Dean E. Carlson; Arthur A. Churm; Walter L. Rees

[57] ABSTRACT

An electromagnetic energy collection device is provided which does not require a solar tracking capability. It includes an energy receiver positioned between two side walls which reflect substantially all incident energy received over a predetermined included angle directly onto the energy receiver.

17 Claims, 10 Drawing Figures

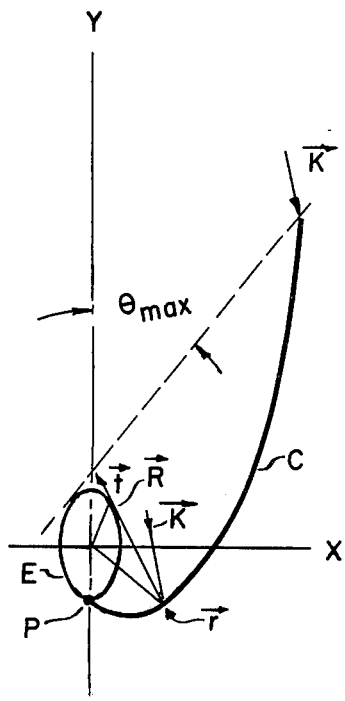
Fig 3
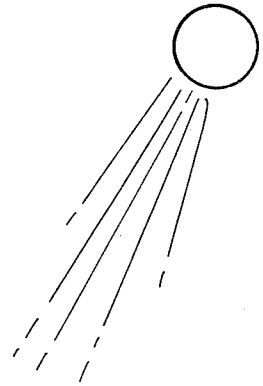
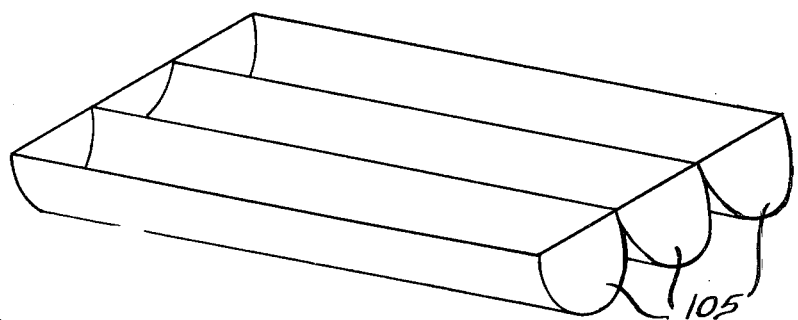
Fig-10

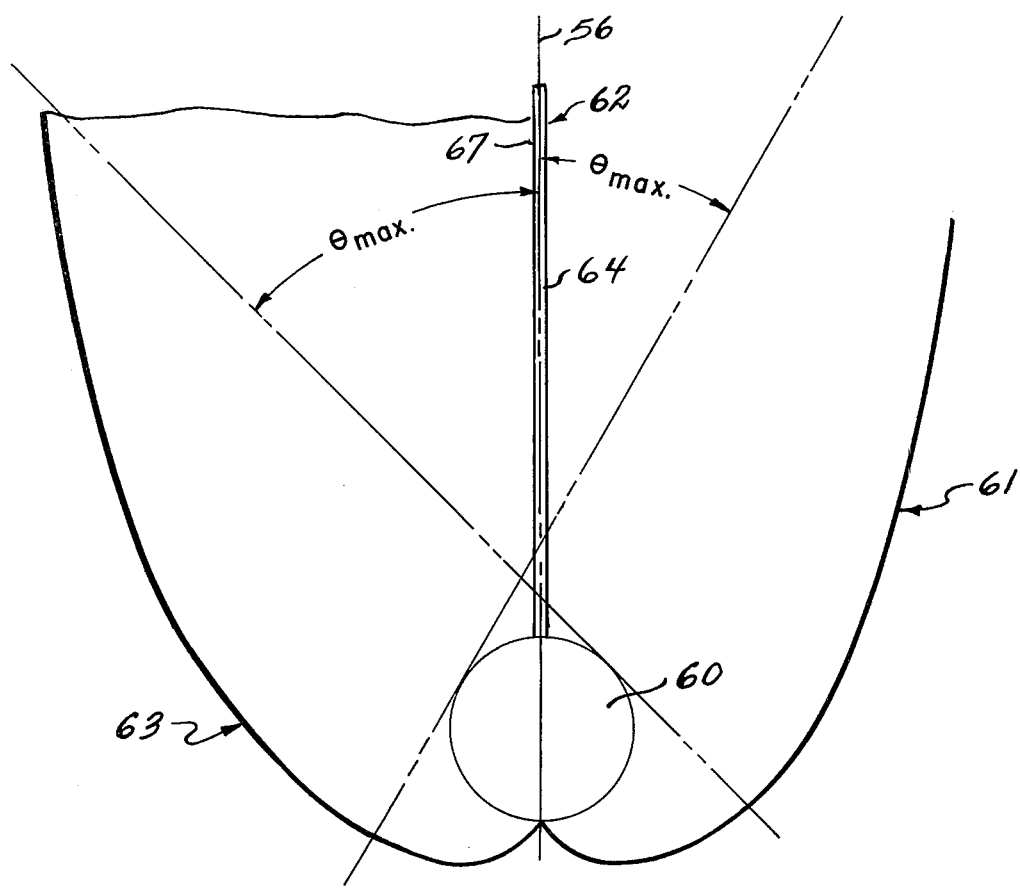
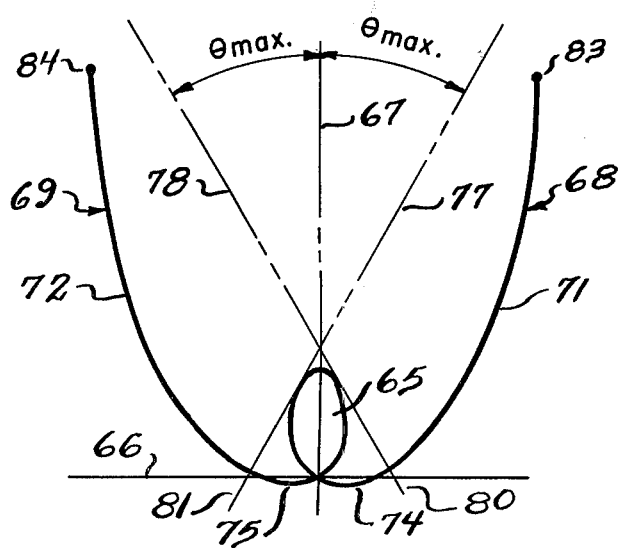

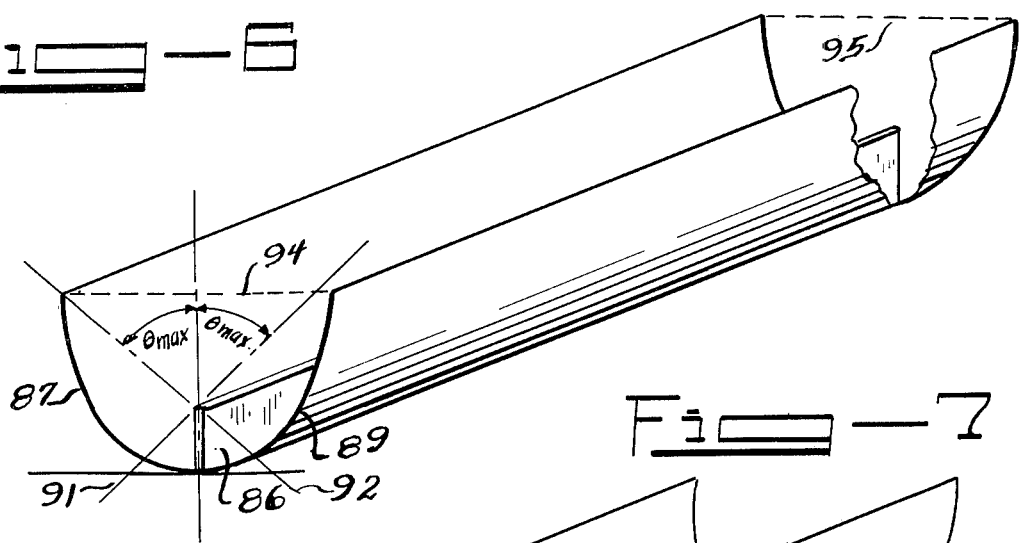
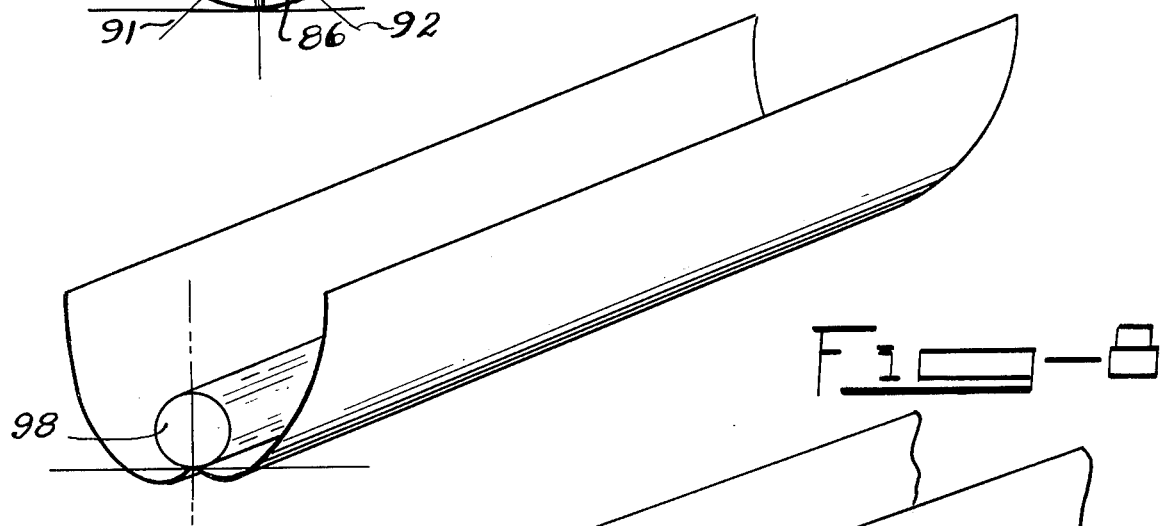
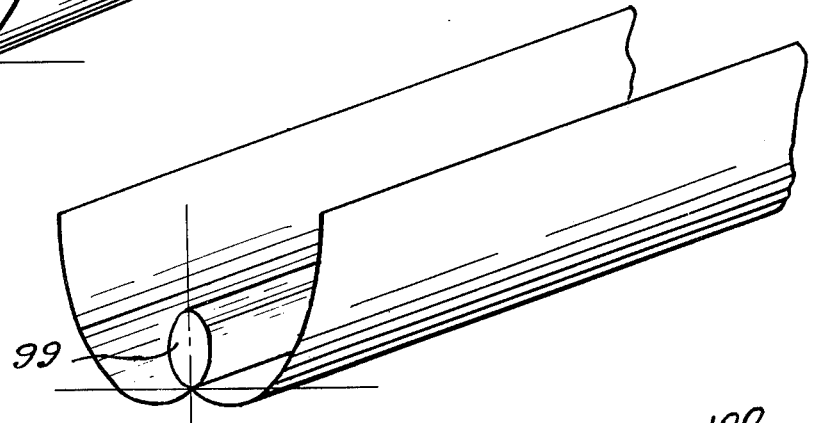
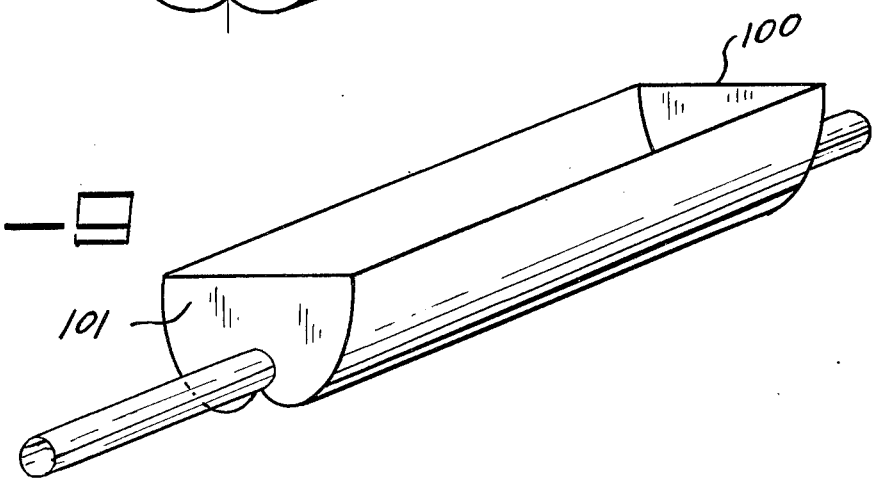

RADIANT ENERGY COLLECTOR

CONTRACTURAL ORIGIN OF THE INVENTION

The invention described herein was made in the course of, or under, a contract with the UNITED STATES ATOMIC ENERGY COMMISSION.

BACKGROUND OF THE INVENTION

The present invention relates generally to electromagnetic energy collection and more particularly to devices useful in the collection and utilization of radiant energy from solar and other sources. The problems associated with the prior art schemes for the efficient utilization of solar energy are avoidance of energy loss through re-radiation (i.e., energy conservation) and avoidance of intricate, and hence costly, apparatus for tracking the sun in its apparent daily motion through the celestial sphere. For example, one attempt to solve solar energy conservation problems involves providing selective coatings on energy-absorbing surfaces and elaborate insulation of the particular energy "trap" employed for the utilization of collected energy. Another attempt involves including in the collection scheme reflective or refractive concentration apparatus to permit collection of solar energy impinging upon a relatively large area and focusing of collected energy toward a relatively small area of utilization. Most of these are mirroring and lens systems which are basically imaging systems wherein solar energy is reflected or refracted to a system focal point at which the "concentrated" energy is utilized for heating or power generation. These systems require tracking systems to follow the sun and thus are of questionable practicality for use in large solar energy collection systems which could replace or supplement conventional power systems.

Among the solutions proposed for avoidance of diurnal solar tracking is the provision of huge, but marginally efficient, mirrored surfaces. None of these systems has adequately solved the problems of energy conservation and solar tracking since solution of one problem often tends to enlarge the difficulties posed by the other. The systems permitting solar concentration by large factors generally require the most careful and frequent diurnal adjustments for solar tracking, while the systems requiring little or no diurnal adjustment generally provide the lowest factors of concentration.

The inventor and his collaborators in earlier publications have suggested non-imaging light funnels for the collection of light from high-energy particles and for greater concentration capacity than imaging systems, i.e., Review of Scientific Instruments, Vol. 37, No. 8, pp. 1094–5 (1966), ibid., Vol. 39, No. 3, pp. 419–20 (1968), ibid., Vol. 39, No. 8, pp. 1217–8 (1968), and J. Opt. Soc. Am., Vol. 60, No. 2, pp. 245–7 (1970). The similarity between such funnels and the geometry of retinal cones has been noted by the inventor in J. Opt. Soc. Am., Vol. 61, No. 8, pp. 1120–1 (1971). These publications dealt with proposals for "ideal", conical-shaped, light collectors which approach an $f$ number equal to 0.5, a physically unrealizable limit for lens systems. The field of acceptance of conical collectors therein proposed may be represented by a right circular cone having a gradually diminishing (over about 1°) external boundary cut-off. Therefore through non-imaging, the conical collector still required a tracking capability.

It is therefore an object of this invention to provide a device for efficiently collecting and concentrating radiant energy.

Another object of this invention is to provide a simple, non-imaging radiant energy collection device, useful in the collection of solar energy, which does not require a solar tracking capability.

Another object of this invention is to provide a non-imaging light collector for the collection and concentration of solar energy without solar tracking.

SUMMARY OF THE INVENTION

An electromagnetic energy collection device is provided which does not require a solar tracking capability. It includes an energy receiver having an axis therethrough and being positioned between two side walls on either side of the axis which reflect substantially all incident energy directly onto the energy receiver. Each side wall includes two portions with the first portion of each wall beginning at one point of intersection of the axis with the perimeter of the energy receiver and extending along the involute of that part of the perimeter of the receiver on the same side of the axis as the side wall in question with the fixed point of the involute being the other point of intersection of the axis with the perimeter of the energy receiver. The first portion of each side wall terminates at the intersection with a shadow line tangent to the energy receiver on the same side of the axis as the side in question and which forms an angle with the axis equal to the maximum acceptance angle of the device. The second portion of each wall is an extension of the first portion and is so shaped that all energy crossing the axis at the maximum acceptance angle and striking any point on the second portion is directed along a line tangent to the energy receiver. The second portion terminates when a line tangent to the point of termination is parallel to the axis. The energy receiver may be substantially symmetrical about the axis and may be of such shapes as a circle, an oval or a flat sheet. The collection device also may be provided with opposing end walls joining the side walls. If desired, the device can be constructed using only one side wall. An energy radiator can be used in place of the energy receiver, if desired.

BRIEF DESCRIPTION OF THE DRAWINGS

The invention is illustrated in the drawings of which:

FIG. 3 illustrates the construction of the collector of this invention;

FIG. 4 shows the structure of the invention in which $\theta_{max}$ is not equal on both sides of the reference axis;

FIG. 5 shows the structure of the invention in which the energy transducer has an oval cross section;

FIG. 6 shows the structure of the invention in which the energy transducer is in the form of a flat sheet and the side walls are extended to form a trough;

FIGS. 7 and 8 show heat pipes of circular and oval cross section in a trough-shaped structure incorporating the features of this invention;

FIG. 9 shows the trough-shaped structure of this invention with end walls; and

FIG. 10 shows an array of energy collectors incorporating the features of this invention used for solar energy collection.

DETAILED DESCRIPTION OF THE INVENTION

Figure 1:
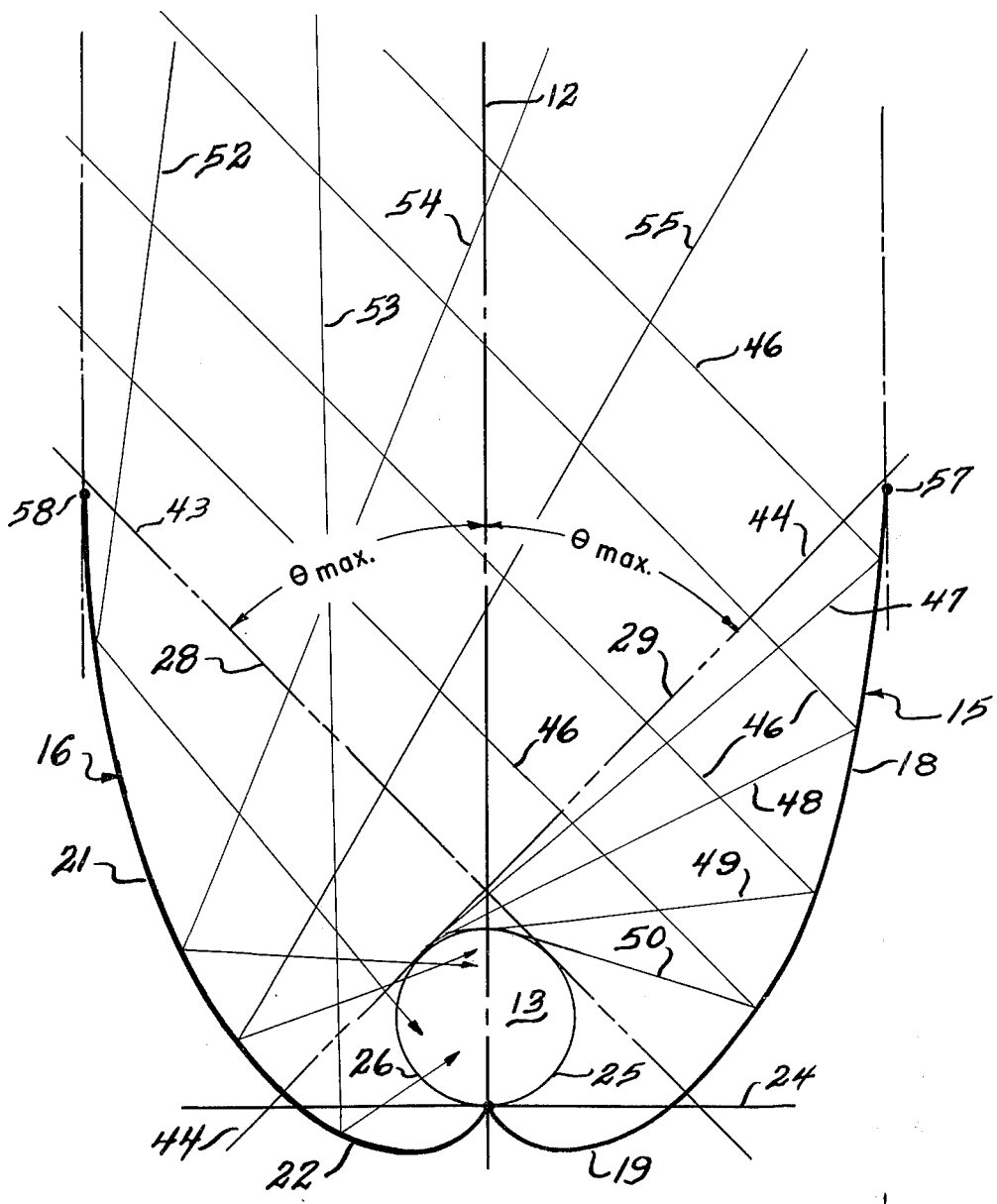
FIG. 1 shows the structure of the invention using an energy transducer of circular cross section.

Referring to FIG. 1, the radiant energy concentration and collection device of this invention receives energy over an included angle $\theta_{max}$ each side of a reference axis 12 and directs this energy into an energy receiver 13. The energy receiver may be, for example, a pipe containing a fluid which is used to carry the heat energy to a desired location for a desired use. The energy receiver could also be a photovoltaic cell which will develop an electric current in response to the radiant energy directed thereon. The type of receiver used is not limited to those described above but any type of energy receiver responsive to radiant energy could be used.

An energy receiver 13 with circular cross section is positioned tangent to a reference plane 24, between side walls 15 and 16 which are shaped to direct radiant energy, which is directed along a line making an angle with reference axis 12 less than $\theta_{max}$, into the energy receiver 13. Energy receiver 13 is shaped so that a line tangent to any point on the surface does not cross the surface of the energy receiver at any other point. Reference plane 24 is not part of the structure but is used to establish the relationship between the receiver and the side walls. The receiver is placed so that it is on one side of the reference plane so that a diameter of the receiver is along the reference axis. Side wall 15 has a first portion 18 and a second portion 19. Side wall 16 has a first portion 21 and a second portion 22. Side wall portions 19 and 22 are involutes of the sides of the energy receiver 13, while the shape of side wall portions 19 and 21 is determined by the angle $\theta_{max}$.

Figure 2:
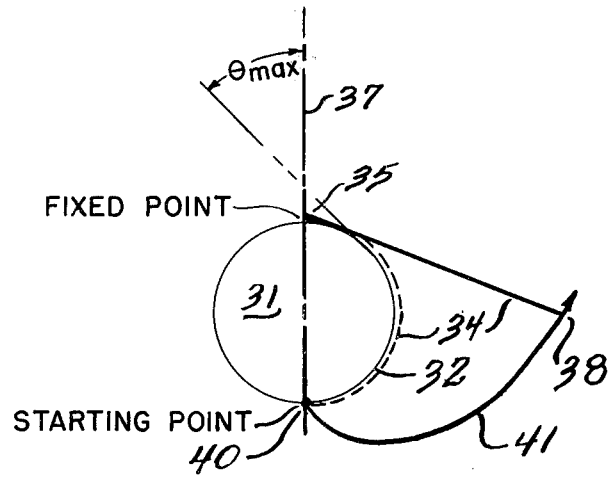
FIG. 2 shows the involute of the side of the energy transducer.

FIG. 2 illustrates the development of the involute of the side of the energy receiver. In FIG. 2, an energy receiver 31 is shown which has the same circular shape as the energy receiver 13 of FIG. 1. The involute of side 32 of energy receiver 31 is formed as follows. A thread 34 is fastened to energy receiver 31 at fixed point 35 which is on the reference axis 37. Reference axis 37 corresponds to reference axis 12 of FIG. 1. Thread 34 is wrapped around side 32 with the end point 38 of thread 34 at starting point 40. The locus of the end 40 of thread 34 as it is unwrapped from the energy receiver 31 is the involute of side 32 of energy receiver 31. This is curve 41 of FIG. 2.

Referring again to FIG. 1, $\theta_{max}$ is the angle over which radiation received along a line making an angle less than $\theta_{max}$ with the reference axis 12 is directed into receiver 13. Lines 43 and 44 are called shadow lines. A shadow line is defined as a line tangent to receiver 13 which crosses the reference axis 12 at a point on the same side of the reference plane 24 as energy receiver 13 at an angle $\theta_{max}$.

The second portions 19 of side wall 15 have the shape of the involute of the side 25 of energy receiver 13. The second portion 22 of side wall 16 has the shape of the involute of side 26 of energy receiver 13. The side wall second portions 19 and 22 terminate at the shadow lines 43 and 44.

The first portion 18 of side wall 15 is shaped so that radiation striking any point on first portion 18 of side wall 15 at an angle $\theta_{max}$ is reflected along a line tangent to energy receiver 13. This is illustrated by radiation lines 46 which are parallel to shadow line 43. Radiation traveling along radiation lines 46 is reflected along lines 47–50 which are tangent to energy receiver 13. Radiation traveling along radiation lines 52, 53, 54 and 55, all of which cross the reference axis 12 at an angle less than $\theta_{max}$, are directed into (or against) energy receiver 13. Side wall portion 18 starts at shadow line 43 as a smooth continuation of first side wall portion 19 and is continued to a terminal point 57 which is the point where a tangent to side wall 15 is parallel to reference axis 12. The second portion 21 of side wall 16 is constructed in the same manner as side wall portion 18 and extends from shadow line 44 to terminal point 58. A line tangent to side wall 16 at point 58 is parallel to reference axis 12. While the concentrator of FIG. 1 has been shown with two side walls, the device can be made with only one side wall if desired. The concentration factor is the width of the aperture divided by the perimeter of the receiver and is equal to $1/\sin \theta_{max}$.

With reference to FIG. 3, we adopt the following definitions for the purpose of this demonstration. $\vec{k}$ is the direction of the extreme ray incident at $\theta_{max}$; S is the arc length along the profile curve E of the receiver measured from point P as origin; $\vec{t}$ is the tangent to E at point R; $l$ is the distance from point R to point $\vec{r}$ on the concentrator C. Therefore, $\vec{r} = \vec{R} - l\vec{t}$. We parameterise curves C and E by S: Then, for $0 \leq S \leq S_1$ we have the usual involute condition $$\frac{d\vec{r}}{ds} \cdot \vec{t} = 0$$

which gives $S_1 = l_1$. For $S_1 \leq S \leq S_2$ we require $$\frac{d\vec{r}}{ds} \cdot \vec{t} = \frac{d\vec{r}}{ds} \cdot \vec{k}$$

which is the condition that the extreme ray be reflected into the tangent. This gives $S_2 = (\vec{R}_2 - \vec{R}_1) \cdot \vec{k} - l_1 - l_2 (\vec{t}_2 - \vec{t}_1) \cdot \vec{k}$. Therefore $S_1 + S_2 = 2 r_{2x} k_x = 2 r_{2x} \sin \theta_{max}$. Hence the concentration factor is $2 r_{2x}/(S_1 + S_2) = 1/\sin \theta_{max}$.

Referring to FIG. 4, there is shown an energy concentrator of a type similar to that shown in FIG. 1. Energy receiver 60 has a circular cross section, but the angles $\theta_{1\ max}$ and $\theta_{2\ max}$ are different. Thus side wall 61 is different from side wall 63. The side walls 61 and 63 are defined in the same way as they were defined in FIG. 1. A mirror 62 having reflecting surfaces 64 and 67 is placed along the reference axis 56. Mirror 62 terminates at a height no less than the height of the longer side wall, in this example side wall 63.

In FIG. 5 there is shown an embodiment of this invention in which the energy receiver 65 has an oval cross section and is positioned on reference plane 66 with an axis of symmetry of the oval lying on the reference axis 67. The first side portions 71 and 72 of side walls 68 and 69 are shaped so that radiant energy received at an angle $\theta_{max}$ is reflected tangent to receiver 65. The second side wall portions 74 and 75 are the involutes of the sides of receiver 65 and extend to the shadow lines 80 and 81. Terminal points 83 and 84 are points on the side walls 68 and 69 where the tangent to the side wall is parallel to the reference axis 67.

In FIG. 6 there is shown an embodiment in which the energy receiver is in the form of a flat sheet with a rectangular cross section. The side walls 87 and 89 are developed in the same way as previously described. It can be noted that the involute of the energy receiver with the thin rectangular cross section is substantially the arc of a circle which extends to the shadow lines 91 and 92.

In FIG. 6 the side walls 87 and 89 are extended to form a trough-shaped structure with the flat-shaped energy receiver 86 also extended in the same direction. This structure provides a structure in which energy entering the collector between the dashed lines 94 and 95 at an angle less than $\theta_{max}$ is directed into the receiver 86. The flat sheet can include, for example, an array of photovoltaic cells for converting the radiant energy into an electric current. It should be noted that the energy receiver shown in cross section in FIGS. 1, 4 and 5 can also be extended as shown for the flat energy receiver 86 of FIG. 6. The mirror 62 of FIG. 4 should also be extended in the same manner.

FIGS. 7, 8 and 9 show other forms of the invention in which the trough-shaped structure, with side walls curved in the manner described herein, incorporates heat pipes as the energy receiver. FIG. 7 shows a heat pipe 98 of circular cross section and FIG. 8 shows a heat pipe 99 of oval cross section. In FIG. 9 there is shown a structure with end walls 100 and 101 which make the structure optically infinitely long.

The structure described and claimed herein is particularly useful in concentration solar radiation as it can receive energy over a wide acceptance angle without requiring that the concentrator be movable to track the sun. Where a high degree of solar concentration is required, it may be necessary to provide for seasonal changes in the collector position. In FIG. 10 there is shown an array of solar energy collectors 105 of the configuration described herein positioned to collect energy from the sun. The side walls would have a reflecting material thereon which would reflect substantially all of the solar energy, as for example aluminum or silver.

While the invention has been described in detail as a collector and concentrator of energy and with an energy receiver, it is not limited to this form. Any electromagnetic energy transducer, receiver or transmitter can be used. Thus, if it is desired to transmit energy over an angle $\theta_{max}$, an energy radiator could be substituted for the energy receiver.

The embodiments of the invention in which an exclusive property or privilege is claimed are defined as follows:

1. A radiant energy concentration device, comprising, an energy receiver positioned tangent to a reference plane, said energy receiver having a first reference axis extending therethrough, with said first reference axis being perpendicular to said reference plane so that said energy receiver extends along said first reference axis away from said reference plane, a first side wall for directing radiant energy positioned on a first side of said energy receiver and having first and second portions, said second portion of said first side wall having the shape of the involute of said first side of said energy receiver and extending from a point of tangency of said energy receiver to said reference plane to a first shadow line of said energy receiver, said first shadow line being defined as the line which crosses said first reference axis at a point on the same side of said reference plane as said energy receiver at an angle $\theta_{1\ max}$ and further which is tangent to said energy receiver on the same side of said first reference axis as said first side wall, said first portion of said first side wall being an extension of said second portion of said first side wall and extending from said first shadow line to no further than a first terminal point, $\theta_{1\ max}$ thereby being the maximum angle from said first reference axis at which all radiation energy crossing said first reference axis at an angle equal to or less than $\theta_{1\ max}$ is directed into said energy receiver by said first side wall, said first portion of said first side wall being shaped so that all radiant energy crossing said first reference axis at said angle $\theta_{1\ max}$ and striking any point on said first portion of said first side wall is directed along a line tangent to said energy receiver, said first terminal point being the point wherein with said first portion of said first side wall extending to said first terminal point a tangent to said first side wall at said first terminal point is parallel to said first reference axis.

2. The device of claim 1 wherein said device is a radiant energy concentration device and said energy transducer is an energy receiver.

3. The radiant energy concentration device of claim 2 further comprising, a second side wall for directing radiant energy into said energy receiver and positioned on a second side of said energy receiver substantially opposite said first side and having first and second portions, said second portion of said second side wall having the shape of the involute of said second side of said energy receiver and extending from a point of tangency of said energy receiver to said reference plane to a second shadow line of said energy receiver, said second shadow line being defined as the line which crosses said first reference axis at a point on the same side of said reference plane as said energy receiver at an angle $\theta_{2\ max}$ and further which is tangent to said energy receiver on the same side of said first reference axis as said second side wall, $\theta_{2\ max}$ being the maximum angle from said first reference axis at which all radiant energy crossing said first reference axis at an angle equal to or less then $\theta_{2\ max}$ is directed into said energy receiver by said second side wall, said first portion of said second side wall being an extension of said second portion of said second side wall and extending from said second shadow line to no further than a second terminal point, said first portion of said second side wall being shaped so that all radiant energy crossing said first reference axis at said angle $\theta_{2\ max}$ and striking any point on said first portion of said second side wall is directed along a line tangent to said energy receiver, said second terminal point being the point wherein with said first portion of said second side wall extending to said second terminal point a tangent thereto is parallel to said first reference axis.

4. The device of claim 3 wherein said first portions of said first and second side walls extend to said first and second terminal points respectively.

5. The radiant energy concentration device of claim 4 wherein $\theta_{2\ max}$ is different from $\theta_{1\ max}$ and further including a mirror positioned on said first reference axis and extending along said first reference axis to a point no less than the height of the longer of said first and second side walls, said mirror having opposing reflective sides facing said first and second side walls.

6. The radiant energy concentration device of claim 4 wherein $\theta_{1\ max}$ equals $\theta_{2\ max}$.

7. The radiant energy concentration device of claim 6 wherein the cross section of said energy receiver is in the shape of a circle with a diameter thereof extending along said first reference axis.

8. The radiant energy concentration device of claim 6 wherein the cross section of said energy receiver is in the shape of an oval which has an axis of symmetry extending along said first reference axis.

9. The radiant energy concentration device of claim 6 wherein said energy receiver extends along a second reference axis parallel to said reference plane, said first and second side walls also extending in the direction of said second axis and being parallel thereto to form a trough-shaped structure.

10. The radiant energy concentration device of claim 9 wherein said energy receiver is in the form of a flat sheet having a longitudinal axis extending along said second reference axis with said flat sheet being disposed symmetrically with respect to said first reference axis.

11. The radiant energy concentration device of claim 9 wherein said energy receiver is in the form of a flat sheet and having a longitudinal axis extending along said second reference axis and a transverse axis extending along said first reference axis whereby a first side of said flat sheet is opposite said first side wall and a second side of said flat sheet is opposite said second side wall.

12. The radiant energy concentration device of claim 11 wherein said energy collector includes photovoltaic cells positioned on said first and second sides of said flat sheet energy receiver for receiving radiant energy.

13. The radiant energy concentration device of claim 9 and further including a pair of opposing end walls joining said first and second side walls with said end walls being perpendicular to said reference plane.

14. The radiant energy concentration device of claim 9 wherein said first and second side walls are formed of a material for reflecting substantially all solar radiation directed thereon.

15. The radiant energy concentration device of claim 14 wherein said energy receiver is in the form of a heat pipe.

16. The radiant energy concentration device of claim 15 wherein said heat pipe is in the form of a tube having a circular cross section with a diameter of said tube extending along said first reference axis and the longitudinal axis of said tube extending along said second reference axis.

17. The radiant energy concentration device of claim 15 wherein said heat pipe is in the form of a tube having a symmetrical oval cross section with an axis of symmetry of said oval tube extending along said first reference axis and the longitudinal axis of said tube extending along said second reference axis.

* * * * *